United States Patent [19]

McCracken et al.

[11] Patent Number: 5,299,294
[45] Date of Patent: Mar. 29, 1994

[54] METHOD FOR COMPENSATING FOR FONT RESOLUTION CONVERSION ERROR

[75] Inventors: Andrew J. McCracken, Winter Springs; Robert W. J. Wyatt, Apopka, both of Fla.

[73] Assignee: Xerox Corporation, Stamford, Conn.

[21] Appl. No.: 770,800

[22] Filed: Oct. 1, 1991

[51] Int. Cl.⁵ ............................................. G06F 15/00
[52] U.S. Cl. .................................... 395/110; 395/102
[58] Field of Search ............... 395/102, 110, 105, 151, 395/109; 340/728, 731, 735; 358/428, 451

[56] References Cited

U.S. PATENT DOCUMENTS 4,516,173  5/1985  Abe et al. ............................. 395/151

Primary Examiner—Arthur G. Evans

[57] ABSTRACT

The present invention provides a process for compensating for error in the position of characters in a character string that can result from printing text data intended for a printer having one resolution on a printer having equivalent fonts, but a different resolution. The method comprises the steps of determining the conversion error for a character in a string of characters, accumulating the conversion error, determining whether the accumulated conversion error equals or exceeds a predetermined threshold value, positioning the next character in the string from the present character by the amount of the predetermined threshold value and decrementing the accumulated conversion error, provided the accumulated conversion error equaled or exceeded the predetermined threshold value, and repeating the above steps for the next character in the character string. The invention further includes the additional steps of examining character strings occupying the same baseline for instances in which a relative move of one character string abuts a relative move or a space character of another character string, and in such instances replacing the relative move and the abutting relative move or space with an equivalent relative move.

5 Claims, 5 Drawing Sheets

METHOD FOR COMPENSATING FOR FONT RESOLUTION CONVERSION ERROR

BACKGROUND AND INFORMATION DISCLOSURE STATEMENT

This invention relates to electronic printers and printing systems, and more particularly, to a method of correcting for errors in positioning of one or more characters resulting from printing text data intended for a printer having one resolution on a printer having equivalent fonts, but a different resolution.

At present, electronic printers such as laser printers have certain standard resolutions, such as 240, 300 and 600 spots per inch (spi). To print text, electronic printers include libraries of fonts, stored in memory, that each have typefaces of various sizes for each character desired. Typically, an electronic printer prints one or more pages of text in response to data received from a host computer over a communications channel. The page data is formatted in a standard print language, such as IBM EBCDIC, that positions text on a page by grouping the text as strings of characters having the same typeface. For each character to be printed, the printer will access its font memory to retrieve a typeface of the appropriate character, size and font type, described as a bitmap or as a series of commands in a page description language. The bitmap describes, pel by pel, the image of the typeface the printer should print to represent the particular character required by the data. Similarly, the page description language has the similar effect of constructing an image of the typeface at the pel level. In both cases, the typeface is described in a manner that corresponds to the particular resolution of the printer.

It is desirable to be able to print text page data, intended for a printer having one resolution on a printer having a different resolution. More particular, it is desired that the text page data cause the first resolution and second resolution printers to print pages that are "light test compatible." Short of light test compatibility, a high standard, pages of text printed on the second resolution printer are generally acceptable if certain readily visible features are the same as on pages of text printed on the first resolution printer. In particular, any text alignment present on first resolution pages, such as right justification of text lines, should also be present on second resolution pages.

At present, efforts at light test compatibility have been directed towards converting fonts from the first resolution to the second resolution. Font designers have been most successful in converting fonts where one resolution is an integer multiple of the other resolution. For example, 300 spi fonts are readily converted to 600 spi fonts. More problematic is converting fonts where one resolution is not an integer multiple of the other resolution. For example, converting a 240 spi font to a 300 spi font involves increasing the width and height of the 240 spi font by a factor of 5/4. To match a 240 spi type having a width of 61 pels, a 300 spi type would need to be 76.25 pels wide. Most electronic printers, however, cannot print fractional pels. Accordingly, the approximating 300 spi type would need to be either 76 pels or 77 pels wide, 1/1200 of an inch too narrow and 3/1200 of an inch too wide, respectively. Either choice would contribute to failing the light test. Moreover, in a string of characters the effect of fractional pel conversion errors would be cumulative, leading to noticeable misalignment of lines of text. Accordingly, when printing text from page data originally intended for a first resolution printer on a second resolution printer having converted resolution fonts, there is a particular need for a method for correcting errors in the position of characters caused by resolution conversion error.

SUMMARY OF THE INVENTION

The present invention provides a process for compensating for error in the position of characters in a character string that can result from printing text data intended for a printer having one resolution on a printer having equivalent fonts, but a different resolution. The position differences are caused by the equivalent typefaces varying in width between the two resolutions. The method comprises the steps of determining the conversion error for a character in a string of characters, accumulating the conversion error, determining whether the accumulated conversion error equals or exceeds a predetermined threshold value, positioning the next character in the string from the present character by the amount of the predetermined threshold value and decrementing the accumulated conversion error, provided the accumulated conversion error equaled or exceeded the predetermined threshold value, and repeating the above steps for the next character in the character string. The invention further includes the additional steps of examining character strings occupying the same baseline for instances in which a relative move of one character string abuts a relative move or a space character of another character string, and in such instances replacing the relative move and the abutting relative move or space with an equivalent relative move.

DESCRIPTION OF THE PREFERRED EMBODIMENT

Figure 1:
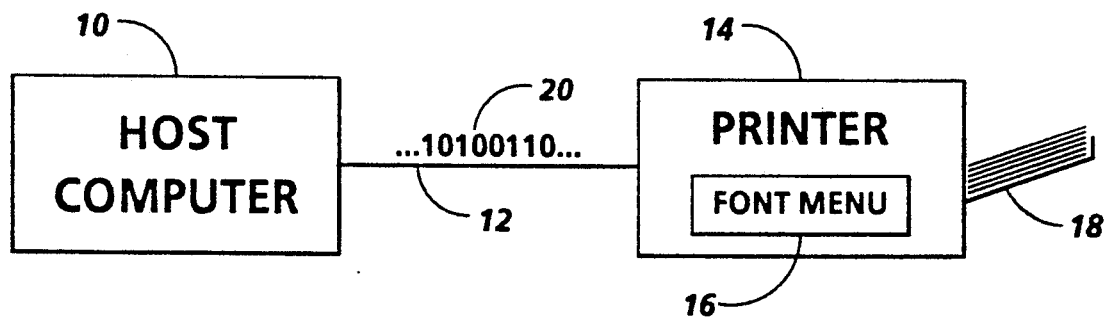
FIG. 1 is a system diagram of a host computer connected via a communications channel to a printer.

Referring now to FIG. 1, there is shown a system diagram of a host computer 10 connected via a communications channel 12 to a printer 14. Host computer 10 can be almost any computer, including a mainframe computer, such as an IBM 360, a minicomputer, or a microcomputer. Communications channel 12 can be a narrow bandwidth channel, such as a telephone line, or a wide bandwidth channel. Printer 14 includes decentralized printers and large, centralized printers, connected to a mainframe host computer 10 via a wide bandwidth channel 12. Printer 14 includes font memory 16 in which resides bitmaps that enable printer 14 to print characters on printed pages 18 in response to data 20 received from host computer 10. Data 20 is in the form of a printing language, such as IBM EBCDIC, and can include characters, control commands and descriptions of fonts.

Figure 2:
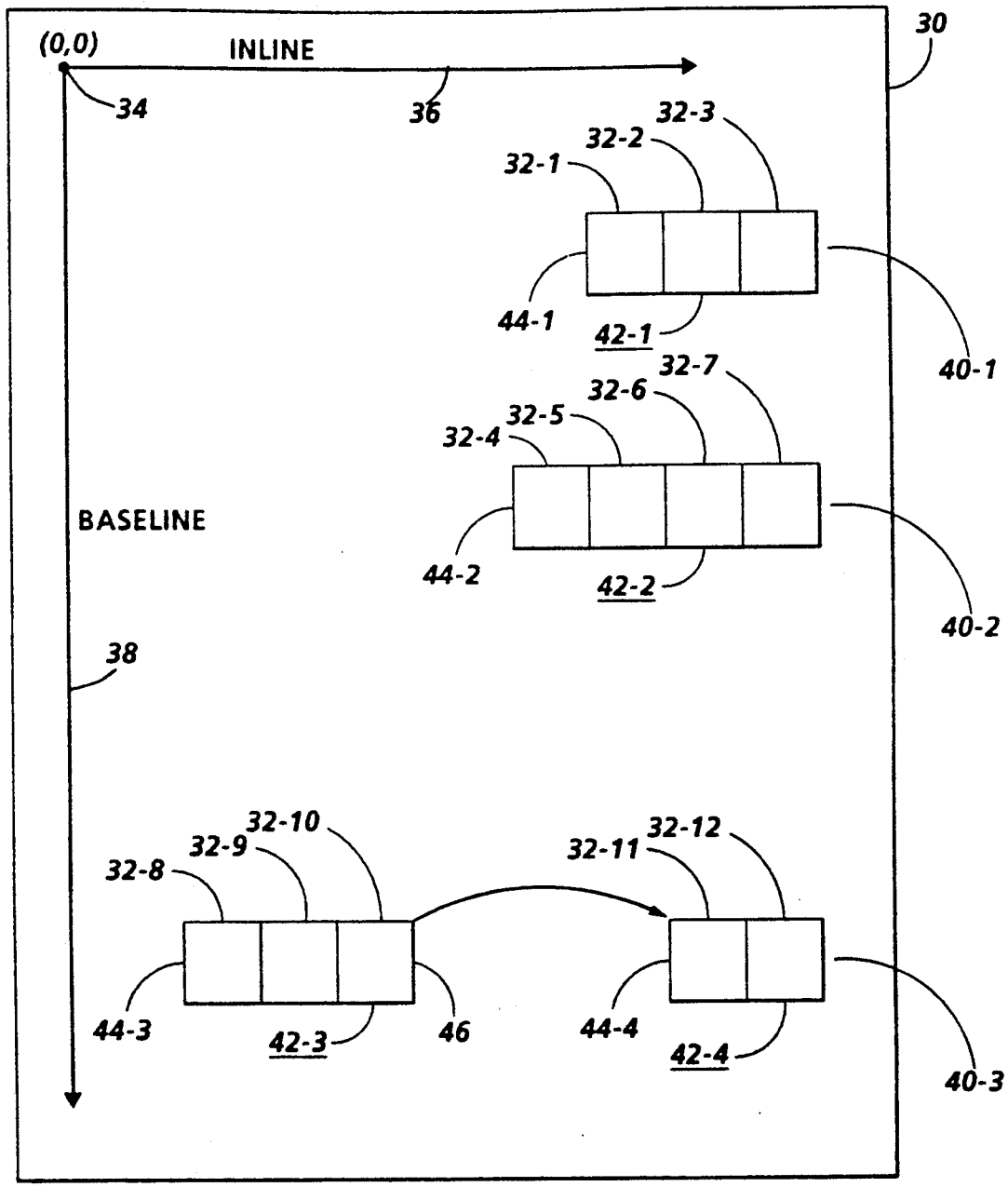
FIG. 2 is a schematic representation of a single printed page of a document having characters printed using typeface having a resolution of 240 spots per inch.

Referring now to FIGS. 1 and 2, in FIG. 2 there is shown a schematic representation of a single printed page 30 of a document having characters 32 printed by printer 14. Printer 14 printed page 30 using one or more fonts, stored in font memory 16, each having a resolution of 240 spots per inch (spi). Data 20 for page 30 was specified to printer 14 in IBM EBCDIC printing language. The structure of IBM EBCDIC is well known to one skilled in the art. For a page 30, the position of characters 32 on page 30 is specified using a cartesian coordinate system, in units of pixels or pels, relative to an origin 34, shown here in the upper left corner of page 30. The axis of the coordinate system are labled inline 36 and baseline 38 for the respective directions of characters 32 across the page 30 and lines of characters 40 down the page 30.

Page 30 includes three character lines 40, all of which are right justified. Top line 40-1 consists of one character string 42-1 that includes three characters, 32-1, 32-2 and 32-3. In data 20, the position of a character string 42, such as character string 42-1 on page 30, is specified in data 20 by denoting the position of the left edge 44-1 of the first character 32-1 of character string 42-1 in the in-line direction 36 relative to the origin 34. Similarly, middle line 40-2 consists of one character string 42-2 that includes four characters 32-4, 34-5, 34-6 and 34-7, and that is positioned in data 20 by referring to the left edge 44-2 of the first character 32-4 of character string 42-2 in the in-line direction 36. Bottom line 40-3 consists of two character strings, one character string 42-3 preceding the other character string 42-4 in the inline direction 36. In data 20, character string 42-3 consists of three characters 32-8, 32-9 and 32-10, and is positioned by referring to the left edge 44-3 of the first character 32-8 of character string 42-3 in the in-line direction 36. Character string 42-4, however, is positioned in data 20 relative to the right edge 46 of the last character 32-10 in character string 42-3: an EBCDIC command, called a relative move command, positions the left edge 44-4 of the first character 32-11 of character string 42-4 in the in-line direction 36 relative to the right edge 46.

Figure 3:
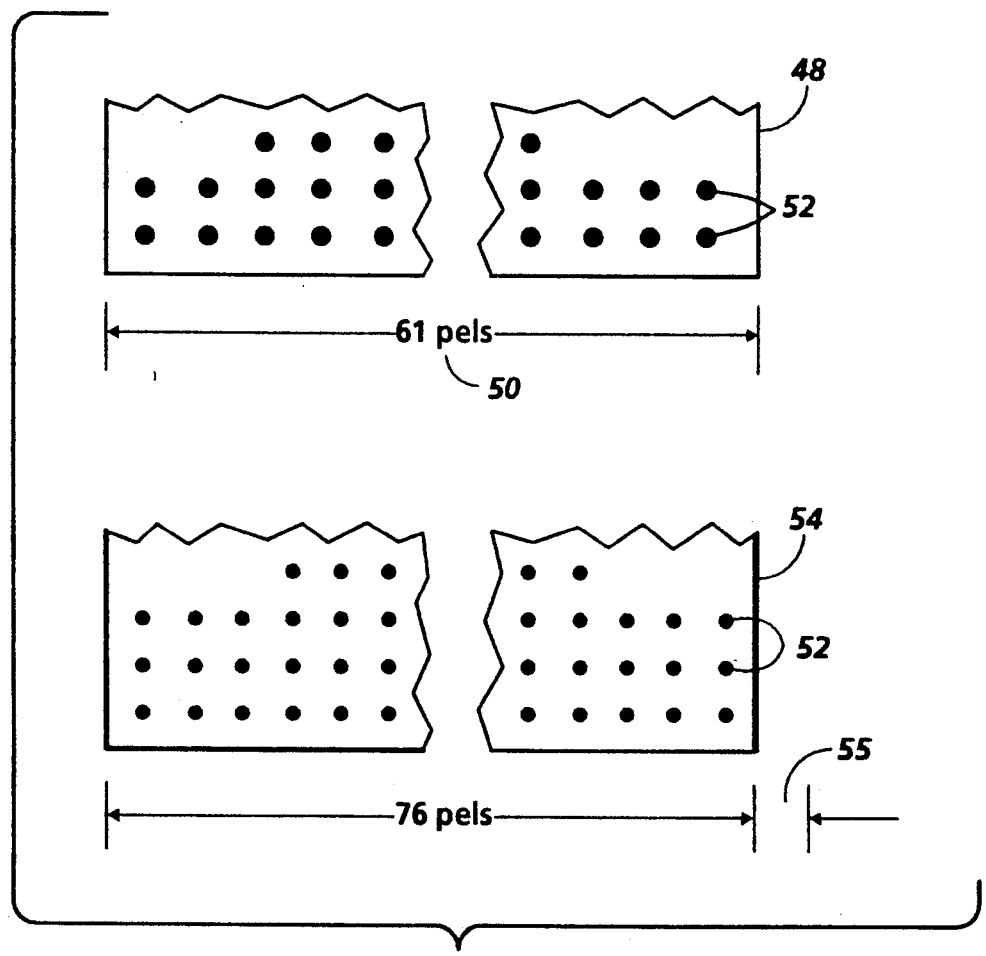
FIG. 3 is a schematic representation of a single character of a particular font printed twice, once with a 240 spi typeface and once with a 300 spi typeface, showing the conversion error between the two different resolution typefaces.
Figure 4:
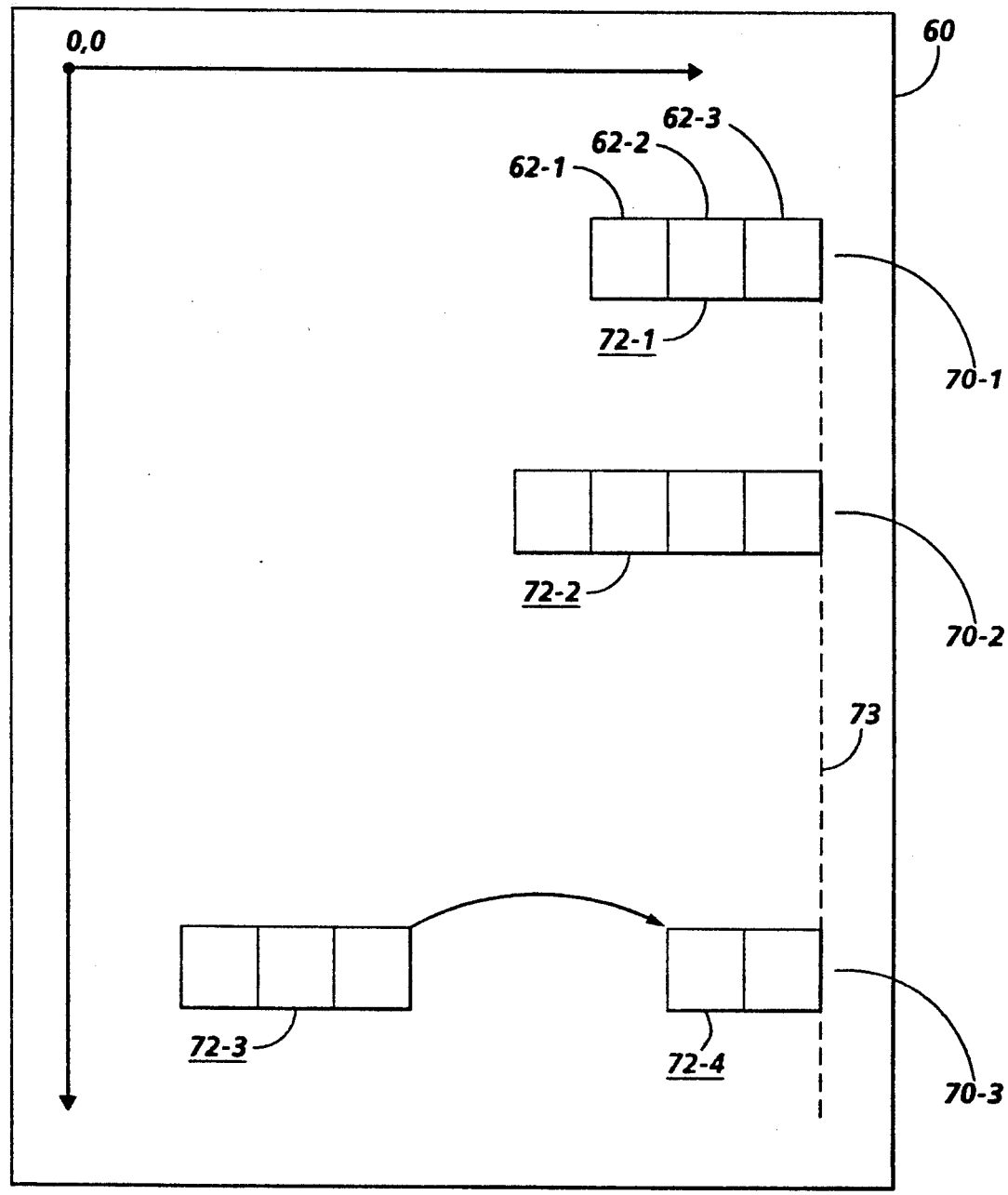
FIG. 4 is a schematic representation of the single printed page of the document of FIG. 2, but with the characters converted from a typeface having a resolution of 240 spots per inch, as shown in FIG. 2, to a typeface having a resolution of 300 spots per inch according to a prior art method of resolution conversion.

Conversion error can be demonstrated with reference to FIGS. 3 and 4. In FIG. 3a there is shown a partial schematic representation of an exemplary typeface 48 used to print one or more of the characters 32 on page 30. Like all the typefaces used by printer 14 to print page 30, typeface 48 has a resolution of 240 spi. Font memory 16 stores a bit map representation of typeface 48 and also stores the width 50 of typeface 48 in pels 52. (Knowledge of width 50 is used by printer 14 in composing page 30.) Typeface 48 has a width of 61 pels, or 61/240 of an inch. In FIG. 3b there is shown a partial schematic representation of a typeface 54 designed by a font designer to replicated typeface 48, but in a resolution of 300 spi instead of 240 spi. Note that a width of 61 pels for 240 spi printer 14 converts to a width of 76.25 pels for a 300 spi printer 14. However, generally printers 14 are not equipped to print fractional pels 52. Accordingly, the font designer must truncate typeface 54, making it 76 pels wide (rounding up runs the risk of a line of converted characters routinely exceeding margins or the edge of the page), resulting in a typeface 54 that is 1/1200 shorter than the equivalent 240 spi typeface 48. The need for such truncations is the basis for conversion error.

An example of the results of a prior art conversion is shown in FIG. 4. FIG. 4 shows a schematic representation of a single printed page 60 printed on a printer 14 having 300 spi resolution that corresponds to the single printed page 30 of FIG. 2 printed on a printer 14 having 240 spi resolution. Page 60 was printed by merely substituting typefaces from 300 spi converted fonts for the typefaces from 240 spi fonts used to print page 30. Page 60 includes characters 62 grouped in character strings 72 arranged in lines 70. While a fractional pixel error in a single character 62 may not be noticeable, fractional pixel errors accumulate in a character strings 72, so that the positioning error in a long character string 72 may total several pels, an error that is most noticeable when character lines 40 that are supposed to align (e.g., right justified text) do not align. In particular, as a result of cumulative error amounting to multiple pels, character string 72-2 is shown ending to the left of right margin 73, indicating misalignment of the right-justified lines 70.

Figure 6:
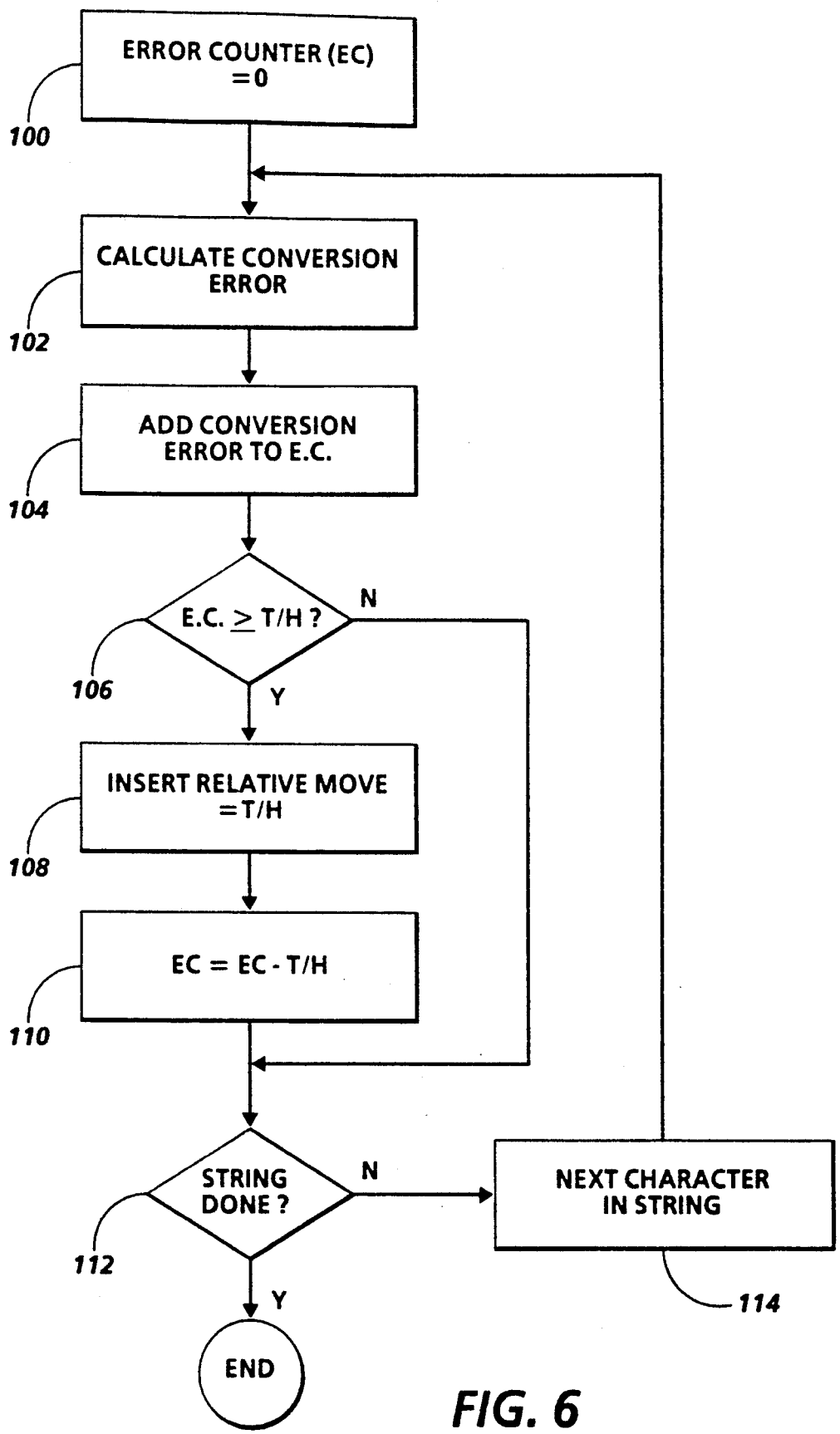
FIG. 6 is a schematic representation of the single printed page of the document of FIG. 2, but with the characters converted from a typeface having a resolution of 240 spots per inch, as shown in FIG. 2, to a typeface having a resolution of 300 spots per inch according to the method described in FIG. 5.
Figure 5:
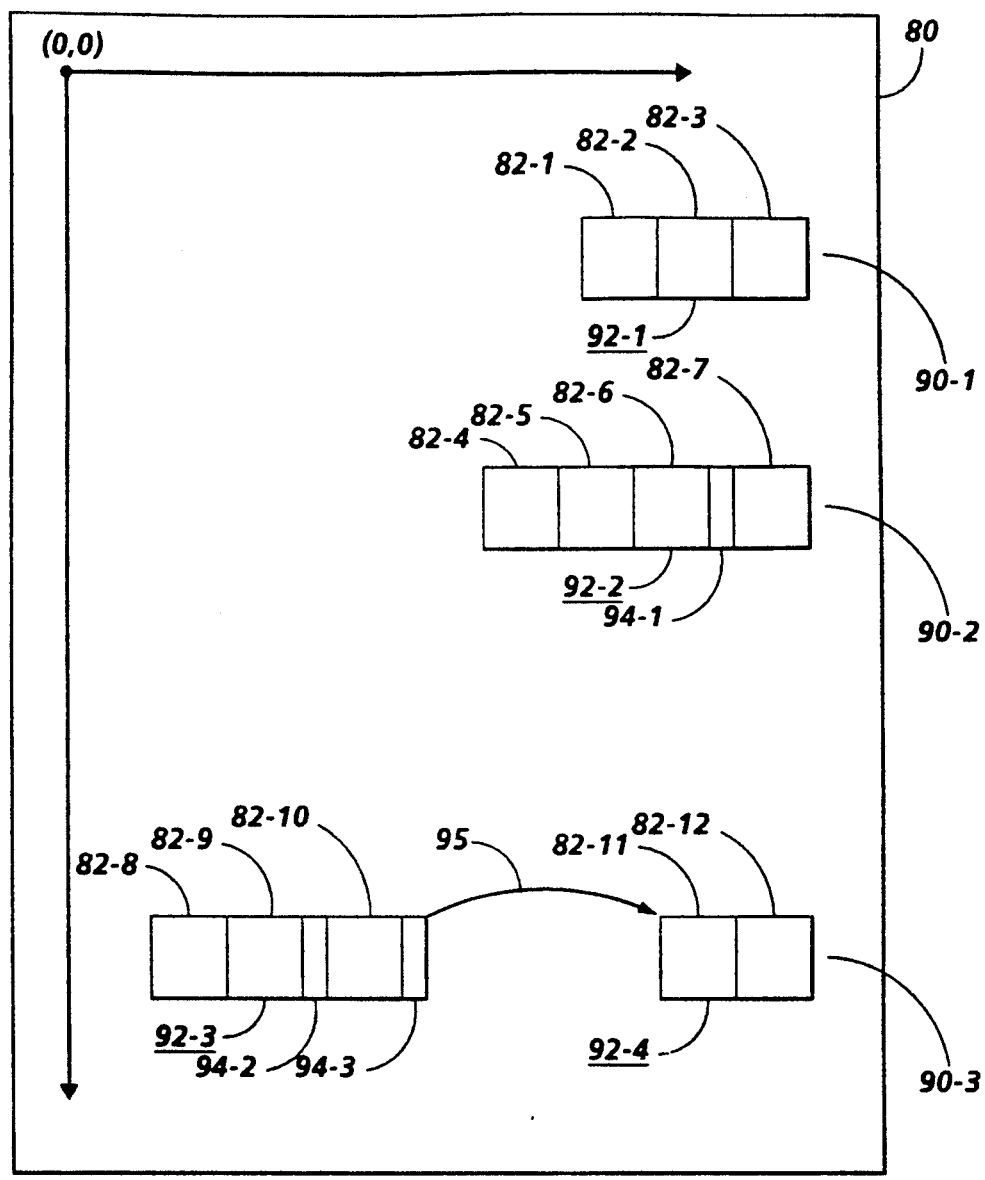
FIG. 5 is a flow chart describing a method of correcting resolution conversion error for a string of characters.

Referring now to FIGS. 5 and 6, in accordance with the invention a method is provided to correct for conversion error by adjusting the positioning of characters 82 in a character string 92 printed in a converted typeface. In FIG. 5 there is shown a schematic representation of a single printed page 80 printed on a printer 14 having 300 spi resolution that corresponds to the single printed page 30 of FIG. 2 printed on a printer 14 having 240 spi resolution. To print page 80, host computer 10 downloaded converted fonts to 300 spi printer 14, and processed data 20, prior to sending it to printer 14, according to the method shown in the flowchart of FIG. 6. For each character string 92 on page 80, beginning with the first character 82 in the character string 92 the following steps are performed: First, in step 100 an error counter is initialized to zero. Next, in steps 102 and 104, respectively, the conversion error is calculated for character 82 and the conversion error is added to the error counter. In step 106 the amount stored in the error counter is compared to a predetermined threshold. If the amount in the error counter is less than the threshold, in step 112 it is determined if the present character 82 is the last character 82 in the character string 92. However, if the amount in the error counter is equal to or greater than the threshold, before performing step 112 in step 108 a relative move in the amount of the threshold is inserted in data 20 following the present character 82 and in step 110 the error counter is decremented by the amount of the threshold. Preferably, the predetermined threshold is the minimum resolution of the printer 240, 1 pel, which is the minimum integer amount of conversion error.

In step 112, if the last character 82 in string 92 has not been processed, the next character 82 in character string 92 is selected in step 114 and the above steps are repeated, beginning with step 100. Otherwise, processing of the particular character string 92 is complete.

Figure 7:
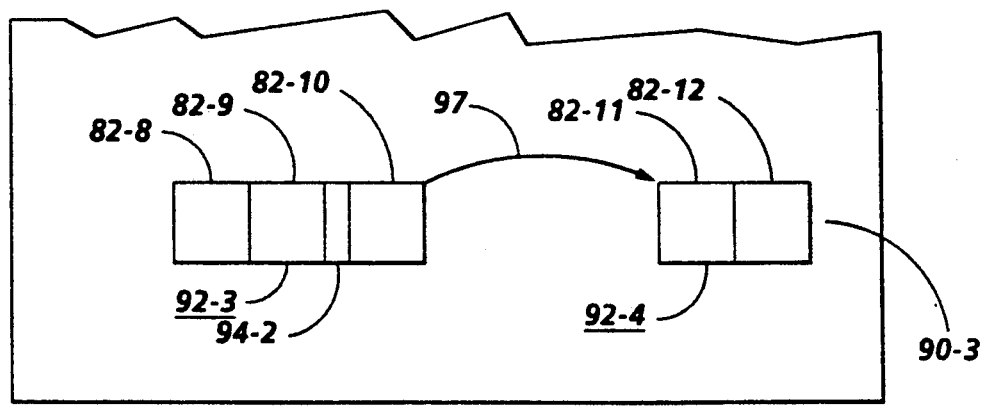
FIG. 7 is a schematic representation of the command simplification process applied to a character string present on the single printed page of FIG. 6.

In accordance with another aspect of the invention, after all the character strings 92 on a page 80 have been processed according to the method of FIG. 6, host computer 10 examines the data 20 relating to the page 80 to minimize the amount of data that need be sent to printer 14. In particular, there is a search performed to locate character strings 92 that share the same baseline, font and text color. In such cases, the end of one character string and the beginning of the next character string are examined. Where a relative move is followed by another relative move, the two relative moves are combined into a single, equivalent relative move, thereby reducing the amount of data 20 by a command. Similarly, referring now to FIGS. 5 and 7, where a relative move is followed by a character that is a space, the relative move and the space are replaced by an equivalent relative move. For example, in FIG. 5 character string 92-3 and 92-4 share the same baseline, font and text color. Character string 92-3 includes end character 82-10, which is followed by a single pel relative move added to reduce conversion error, followed by relative move 95. Relative move 95 positions character string 92-4 relative to character string 92-3. In FIG. 7, relative moves 94-3 and 95 are shown combined into a single equivalent relative move 97. A further simplification would be possible if the first character of string 92-4, character 82-11 (the character abutting the end of string 92-3), was a space. Then a single equivalent relative move (not shown) could replace character 82-11 as well as relative moves 94-3 and 95. Replacing space character 82-11 not only would reduce commands in data 20, but would also reduce the set-up time of printer 14, which would no longer need to reference its font memory 16 to learn the width of space character 82-11.

Many modifications and variations are apparent from the foregoing description of the invention and all such modifications and variations are intended to be within the scope of the present invention.

We claim:

1. A method of compensating for error in the position of characters in a character string that can result from printing text data intended for a printer having one resolution on a printer having equivalent fonts, but a different resolution, the method comprising the steps of:
    a) determining the conversion error for a character in a string of characters;
    b) accumulating the conversion error;
    c) determining whether the accumulated conversion error equals or exceeds a predetermined threshold value;
    d) positioning the next character in the string from the present character by the amount of the predetermined threshold value and decrementing the accumulated conversion error, provided in step c the accumulated conversion error equaled or exceeded the predetermined threshold value;
    e) repeating steps a through d for the next character in the character string; and
    f) printing the error-compensated character string.

2. The method of claim 1, wherein the predetermined threshold value is one pel.

3. The method of claim 1, including the additional step of performing repeating steps a through e for all character strings on a page.

4. The method of claim 3, including the step of initializing the accumulated error to zero between operations on different character strings.

5. The method of claim 3, including the additional steps of examining character strings occupying the same baseline for instances in which a relative move of one character string abuts a relative move or a space character of another character string, and in such instances replacing the relative move and the abutting relative move or space with an equivalent relative move.

* * * * *